United States Patent
Wang et al.

(10) Patent No.: US 9,577,789 B2
(45) Date of Patent: Feb. 21, 2017

(54) FREQUENCY DEINTERLEAVING AND TIME DEINTERLEAVING CIRCUIT, METHOD THEREOF AND RECEIVING CIRCUIT OF DIGITAL TELEVISION

(71) Applicant: MStar Semiconductor, Inc., Hsinchu Hsien (TW)

(72) Inventors: Chun-Chieh Wang, Zhubei (TW); Tai-Lai Tung, Zhubei (TW); Ko-Yin Lai, Zhubei (TW); Yi-Ying Liao, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/624,640

(22) Filed: Feb. 18, 2015

(65) Prior Publication Data

US 2016/0164636 A1    Jun. 9, 2016

(30) Foreign Application Priority Data

Dec. 3, 2014    (TW) .............................. 103141964 A

(51) Int. Cl.
| | |
|---|---|
| H04N 7/173 | (2011.01) |
| H04L 1/00 | (2006.01) |
| H04L 27/26 | (2006.01) |
| H04N 21/434 | (2011.01) |
| H04N 21/61 | (2011.01) |
| H04N 21/234 | (2011.01) |

(Continued)

(52) U.S. Cl.
CPC ........... *H04L 1/0071* (2013.01); *H04L 27/265* (2013.01); *H04N 21/23406* (2013.01); *H04N 21/434* (2013.01); *H04N 21/438* (2013.01); *H04N 21/44004* (2013.01); *H04N 21/6112* (2013.01)

(58) Field of Classification Search
CPC . H04N 7/173; H04N 7/17309; H04N 7/17318
USPC ..... 725/68–70, 131–134, 139–142, 151–153
See application file for complete search history.

(56) References Cited

U.S. PATENT DOCUMENTS

| | | | |
|---|---|---|---|
| 7,170,849 B1* | 1/2007 | Arivoli | H03M 13/2707 370/208 |
| 7,433,429 B2* | 10/2008 | Dagan | H03M 13/276 375/262 |

(Continued)

*Primary Examiner* — Annan Shang
(74) *Attorney, Agent, or Firm* — Edell, Shapiro & Finnan, LLC

(57) ABSTRACT

A receiving circuit for a digital television is provided. The receiving circuit of the digital television, adapted to process a digital television signal to generate transmission data, includes: a front-end circuit, configured to process the digital television signal to generate an interleaved signal; a setting unit, configured to provide a setting value associated with a digital video standard of the digital television signal; a frequency de-interleaving and time de-interleaving circuit, configured to select a frequency de-interleaving scheme and a time de-interleaving scheme corresponding to different digital video standards according to the setting value, and to process the interleaved signal to generate a de-interleaved signal; a quadrature amplitude modulation (QAM) demapping circuit, configured to demap the de-interleaved signal to generate a demapped signal; and a decoder, configured to decode the demapped signal to generate the transmission data.

17 Claims, 8 Drawing Sheets

(51) Int. Cl.
*H04N 21/44* (2011.01)
*H04N 21/438* (2011.01)

(56) References Cited

U.S. PATENT DOCUMENTS

| | | | | |
|---|---|---|---|---|
| 7,508,748 B2* | 3/2009 | Kadous | ................ | H04L 1/0003 |
| | | | | 370/208 |
| 2003/0128141 A1* | 7/2003 | Asami | ................ | G01R 31/3167 |
| | | | | 341/120 |
| 2004/0080442 A1* | 4/2004 | Asami | ................... | G01R 13/345 |
| | | | | 341/155 |
| 2005/0104755 A1* | 5/2005 | Tsang | ................ | G11B 20/1426 |
| | | | | 341/59 |
| 2005/0105606 A1* | 5/2005 | Cosand | ............... | H04L 25/4902 |
| | | | | 375/239 |
| 2007/0110178 A1* | 5/2007 | Su | ..................... | H03M 13/2707 |
| | | | | 375/260 |
| 2008/0259891 A1* | 10/2008 | Dent | .................... | H04L 5/0053 |
| | | | | 370/342 |
| 2009/0080545 A1* | 3/2009 | Nicolas | ............. | H03M 13/2909 |
| | | | | 375/260 |
| 2010/0197302 A1* | 8/2010 | Chen | .................... | H04W 99/00 |
| | | | | 455/434 |
| 2015/0139353 A1* | 5/2015 | Baek | .................... | H04L 5/0007 |
| | | | | 375/295 |
| 2015/0341586 A1* | 11/2015 | Allison, III | .............. | H04N 5/40 |
| | | | | 348/724 |
| 2016/0241890 A1* | 8/2016 | Park | .................... | H04N 21/234 |

\* cited by examiner

FIG. 4A

| | 0 | 1 | 2 | 3 | 4 | 5 | 6 |
|---|---|---|---|---|---|---|---|
| 0 | 0 | 36 | 30 | 24 | 18 | 12 | 6 |
| 1 | 7 | 1 | 37 | 31 | 25 | 19 | 13 |
| 2 | 14 | 8 | 2 | 38 | 32 | 26 | 20 |
| 3 | 21 | 15 | 9 | 3 | 39 | 33 | 27 |
| 4 | 28 | 22 | 16 | 10 | 4 | 40 | 34 |
| 5 | 35 | 29 | 23 | 17 | 11 | 5 | 41 |

| i | $R_i$ | $C_i$ |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 0 | 6 |
| 7 | 1 | 0 |
| 8 | 2 | 1 |
| 9 | 3 | 2 |
| 10 | 4 | 3 |
| 11 | 5 | 4 |
| 12 | 0 | 5 |
| 13 | 1 | 6 |
| 14 | 2 | 0 |
| 15 | 3 | 1 |
| 16 | 4 | 2 |
| 17 | 5 | 3 |
| 18 | 0 | 4 |
| 19 | 1 | 5 |
| 20 | 2 | 6 |
| 21 | 3 | 0 |
| 22 | 4 | 1 |
| 23 | 5 | 2 |
| 24 | 0 | 3 |
| 25 | 1 | 4 |
| 26 | 2 | 5 |
| 27 | 3 | 6 |
| 28 | 4 | 0 |
| 29 | 5 | 1 |
| 30 | 0 | 2 |
| 31 | 1 | 3 |
| 32 | 2 | 4 |
| 33 | 3 | 5 |
| 34 | 4 | 6 |
| 35 | 5 | 0 |
| 36 | 0 | 1 |
| 37 | 1 | 2 |
| 38 | 2 | 3 |
| 39 | 3 | 4 |
| 40 | 4 | 5 |
| 41 | 5 | 6 |

FREQUENCY DEINTERLEAVING AND TIME DEINTERLEAVING CIRCUIT, METHOD THEREOF AND RECEIVING CIRCUIT OF DIGITAL TELEVISION

This application claims the benefit of Taiwan application Serial No. 103141964, filed Dec. 3, 2014, the subject matter of which is incorporated herein by reference.

BACKGROUND OF THE INVENTION

Field of the Invention

The invention relates in general to a frequency deinterleaving and time deinterleaving circuit, a method thereof and a receiving circuit of a digital television, and more particularly to a frequency deinterleaving and time deinterleaving circuit, a method thereof and a receiving circuit that can be configured to support multiple digital video standards.

Description of the Related Art

There have been numerous digital television standards, including Digital Video Broadcasting-Terrestrial (DVB-T), Digital Video Broadcasting-Cable2 (DVB-C2), Digital Video Broadcasting-Terrestrial 2 (DVB-T2), Digital Terrestrial Multimedia Broadcast (DTMB), and Integrated Services Digital Broadcasting-Terrestrial (ISDB-T). These different standards are broadcasted and promoted respectively in different regions. Among these standards, DVB-C2, DVB-T2, DTMB and ISDB-T adopt interleaving-deinterleaving schemes in frequency and time domains to minimize various interferences and/or noises have on transmission data during signal transmission. FIG. 1 shows a function block diagram of a conventional receiver of a digital television. The receiver 100 of a digital television mainly includes a front-end circuit 110, a frequency deinterleaving circuit 120, a time deinterleaving circuit 130, a demapping circuit 140, and a decoding circuit 150. An input signal is usually a modulated signal, e.g., a quadrature amplitude modulation (QAM) signal based on orthogonal frequency division multiplexing (OFDM). The front-end circuit 110 performs operations including but not limiting to fast Fourier transform (FFT), channel estimation, equalization and signal-to-noise (SNR) estimation on the input signal, and outputs an interleaved signal that carries including but not limiting to information such as two quadrature components (I and Q), an SNR, or channel state information (CSI). The information is rearranged in a correct sequence after the frequency deinterleaving circuit 120 and the time deinterleaving circuit 130 perform deinterleaving operations, and is restored to bit information after an operation performed by the demapping circuit 140. Next, the transmission data is obtained after an operation (e.g., low-density parity check (LDPC) or Viterbi decoding operation) performed by the decoding circuit 150. It should be noted that, the above DVB-T2 standard further includes a cell interleaving and deinterleaving operation. Therefore, a cell deinterleaving circuit is further included in a DTB-T2-compatible receiver.

The time interleaving and deinterleaving operations mainly involve two operation concepts—convolution and row-column operations. The ISDB-T standard and the DTMB standard adopt the convolution operation, and the DVB-T2 standard and the DVB-C2 standard adopt the row-column operation. Further, the frequency interleaving and deinterleaving operations also involve two main operation concepts—look-up table (LUT) and permutation operations. The ISDB-T standard adopts the look-up table operation, and the DTMB, DVB-T2 and DVB-C2 standards adopt the permutation operation. For both frequency deinterleaving and time deinterleaving, a memory (e.g., a static random access memory (SRAM) or a first-in-first-out (FIFO) memory) is provided for temporary data storage. By writing the information into and reading the information from the memory, the sequence of the information is restored. However, implementation details may slightly vary although the same operation concept is adopted. For example, the DVB-T2 standard and the DVB-C2 standard both adopt the row-column operation concept for time interleaving and deinterleaving, the DVB-C2 standard adopts specifically a twisted row-column operation concept. In conclusion, the receiver 100 of different standards requires a memory to implement frequency and time deinterleaving operations for one of different standards. For a receiver 100 compatible to multiple standards, memory devices may be configured inefficiently if each of these standards utilizes an separate circuit for frequency deinterleaving and time deinterleaving.

SUMMARY OF THE INVENTION

The invention is directed to a frequency deinterleaving and time deinterleaving circuit, a method thereof, and a receiving circuit of a digital television that can be configured to support multiple digital video standards and to save memory utilization.

The present invention discloses a frequency deinterleaving and time deinterleaving circuit. The circuit performs a frequency deinterleaving operation and a time deinterleaving operation on an interleaved signal by using a first memory and a second memory, and is adapted for multiple digital video standards. The circuit includes: a frequency deinterleaving control module, configured to generate a first access index according to a setting value; a time deinterleaving control module, configured to generate a second access index according to the setting value; a first address generating unit, configured to generate a first access address according to the first access index; and a second address generating unit, configured to generate a second access address according to the second access index. The setting value corresponds to a digital video standard of the interleaved signal. The first memory is accessed for temporary data of the frequency deinterleaving operation according to the first access address. The second memory is accessed for temporary data of the time deinterleaving operation according to the second access address.

The present invention further discloses a receiving circuit of a digital television for processing a digital television signal to generate transmission data. The receiving circuit includes: a front-end circuit, configured to process the digital television signal to generate an interleaved signal; a setting unit, configured to provide a setting value associated with a digital video standard of the digital television signal; a frequency deinterleaving and time deinterleaving circuit, configured to select a frequency deinterleaving operation and a time deinterleaving operation corresponding to different digital video standards according to the setting value, and to process the interleaved signal to generate a deinterleaved signal; a quadrature amplitude modulation (QAM) demapping circuit, configured to demap the deinterleaved signal to generate a demapped signal; and a decoder, configured to decode the demapped signal to generate the transmission data.

The present invention further discloses a frequency deinterleaving and time deinterleaving method adapted for multiple digital video standards. The method, which performs a frequency deinterleaving operation and a time deinterleaving operation on an interleaved signal by using a first memory and a second memory, includes: generating a first access index according to a setting value; generating a first access address according to the first access index; accessing the interleaved signal in the first memory according to the first access address to complete the frequency deinterleaving operation; generating a second access index according to the setting value; generating a second access address according to the second access index; and storing accessing the interleaved signal having undergone the frequency deinterleaving operation in the second memory according to the second access address to complete the time deinterleaving operation. The setting value corresponds to a digital video standard of the interleaved signal.

The frequency deinterleaving and time deinterleaving circuit, the method thereof, and the receiving circuit of a digital television of the present invention are capable of being configured to support multiple video standards and complete the frequency deinterleaving operation or the time deinterleaving operation through a shared memory, thereby saving circuit costs.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 4A and FIG. 4B are diagrams of a memory configuration and a memory accessing sequence when a row-column operation unit 384 performs a row-column operation on a DVB-C2 signal, respectively;

DETAILED DESCRIPTION OF THE INVENTION

The present invention discloses a frequency deinterleaving and time deinterleaving circuit, a method thereof and a receiving circuit of a digital television capable of saving memory utilization. The circuit and method may be applied to a digital television that supports multiple digital video standards. Within the realms of implementation possibility, one person skilled in the art can realize the present invention by equivalent elements or steps based on the disclosure of the present invention; that is, the implantation is not limited by the following non-limiting embodiments.

Figure 1:
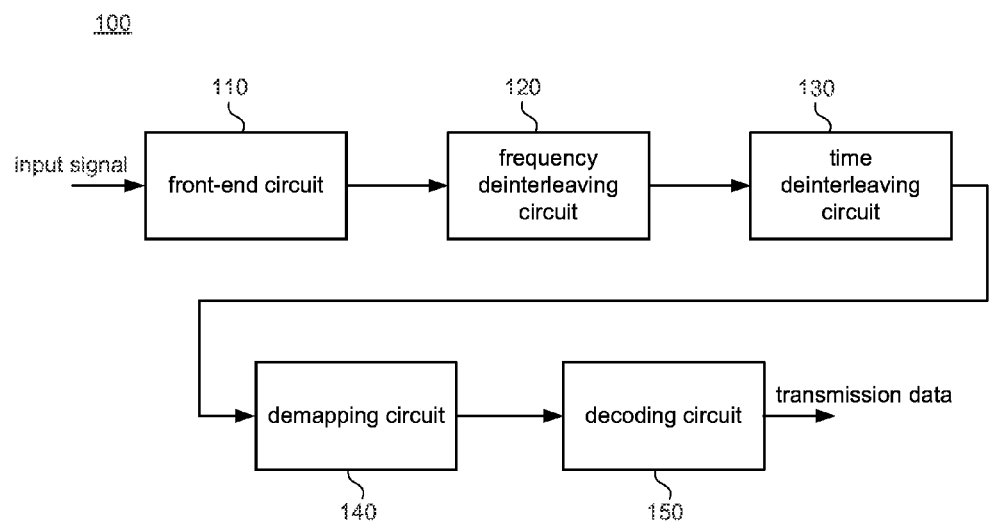
FIG. 1 is a function block diagram of a conventional receiver of a digital television.
Figure 2:
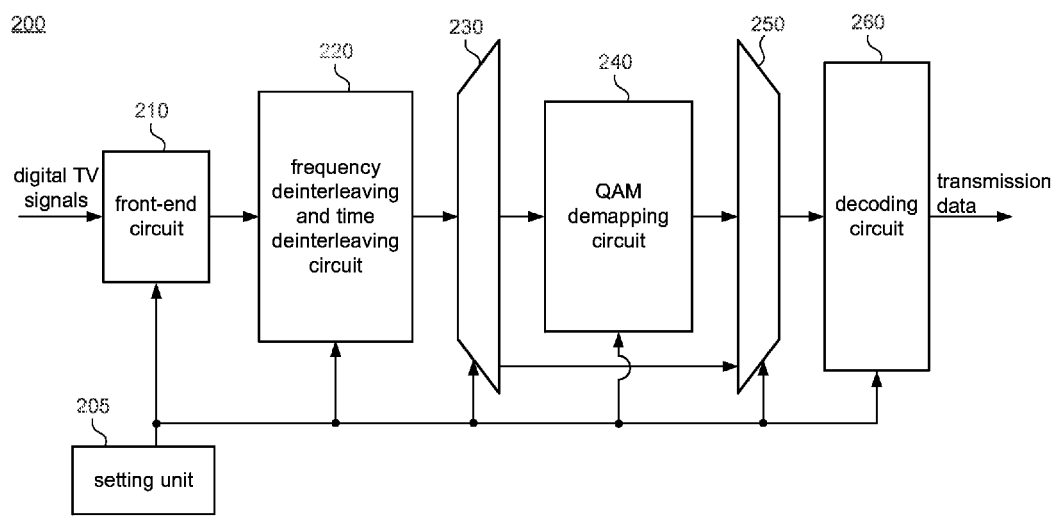
FIG. 2 is a function block diagram of a receiver of a digital television of the present invention.

FIG. 2 shows a function block diagram of a receiver 200 of a digital television of the present invention. The receiver 200 includes a front-end circuit 210 that processes digital television signals. In general, digital television signals in the DTMB, DVB-C2, DVB-T2, ISDB-T and DVB-T standards need to undergo FFT, channel estimation, equalization and SNR estimation processes. Thus, in the front-end circuit 210, one same set of FFT circuit, channel estimation circuit, equalization and SNR estimation circuit may be utilized to process these digital television signals of different standards. Alternatively, the front-end circuit 210 may include multiple sets of the above circuits, and select one of these sets of circuits corresponding to the digital television signal according to a setting value provided by a setting unit 205. For signals of the four standards of DTMB, DVB-C2, DVB-T2 and ISDB-T, the digital television signal is processed by the front-end circuit 210 to generate an interleaved signal, which the interleaved signal has at least undergone frequency interleaving and time interleaving at a transmitter. For the DVB-T2 standard, the interleaved signal has further undergone cell-interleaving. The above setting value may be predetermined by user scenario of the receiver 200. For example, for the receiver 200 of a digital television applied in region that adopts the ISDB-T standard, the setting value is set to a code associated with the ISDB-T standard. For example, the setting unit 205 may be implemented by a register.

Figure 3:
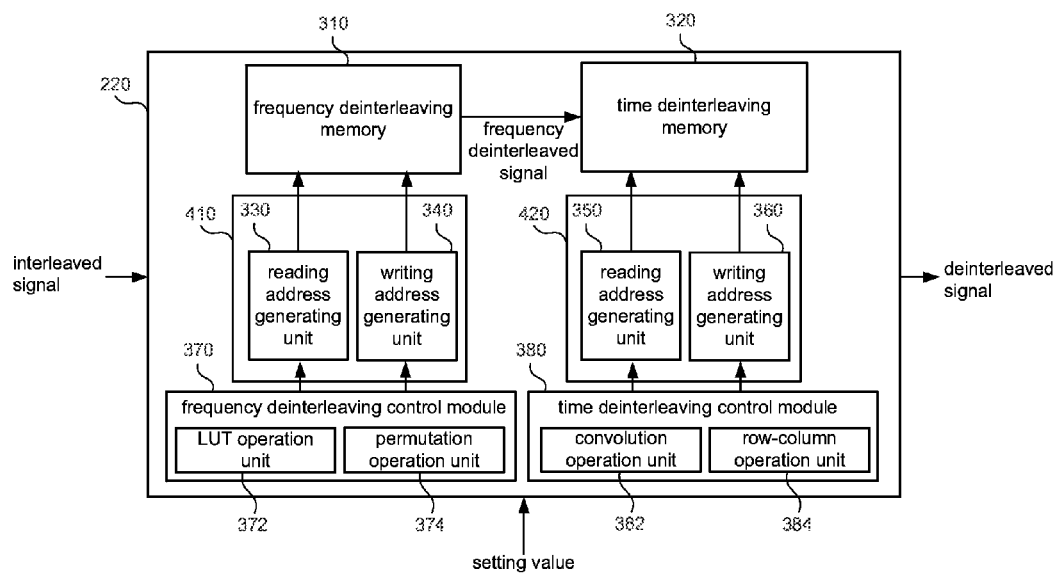
FIG. 3 is a detailed function block diagram of a frequency deinterleaving and time deinterleaving circuit 220 of the present invention.

The interleaved signal is inputted into a frequency deinterleaving and time deinterleaving circuit 220. According to the setting value provided by the setting unit 205, the frequency deinterleaving and time deinterleaving circuit 220 selects a frequency deinterleaving scheme and a time deinterleaving scheme corresponding to the standard of the digital television signal received by the receiver 200. FIG. 3 shows a detailed function block diagram of the frequency deinterleaving and time deinterleaving circuit 220 of the present invention. The frequency deinterleaving and time deinterleaving circuit 220 includes a frequency deinterleaving memory 310, a time deinterleaving memory 320, a first address generator 410, a second address generator 420, a frequency deinterleaving control module 370, and a time deinterleaving control module 380. The first address generator 410 includes a reading address generating unit 330 and a writing address generating unit 340. The second address generator 420 includes a reading address generating unit 350 and a writing address generating unit 360. The frequency deinterleaving control module 370 includes a look-up table (LUT) operation unit 372 and a permutation operation unit 374. The time deinterleaving control module 380 includes a convolution operation unit 382 and a row-column operation unit 384. The frequency deinterleaving control module 370 generates a first access index according to the setting value provided by the setting unit 205 to control the first address generator 410 to accordingly generate a first access address. The first access index includes a reading index and a writing index for controlling the first address generator 410. The first access address includes a reading address and a writing address for accessing the frequency deinterleaving memory 310. The time deinterleaving control module 380 generates a second access index to control the second address generator 420 to accordingly generate a second access address. The second access index includes a reading index and a writing index for controlling the second address generator 420. The second access address includes a reading address and a writing address for accessing the time deinterleaving memory 320. The frequency deinterleaving memory 310 is accessed for the temporary data of the frequency deinterleaving operation according to the first access address, and the time deinterleaving memory 320 is accessed for the temporary data of the time deinterleaving operation according to the second access address. More specifically, according to the reading index and the writing index generated by the deinterleaving control module 370, the reading address generating unit 330 and the writing address generating unit 340 generate the actual reading address and writing address of the frequency deinterleaving memory 310, respectively. Similarly, according to the reading index and the writing index generated by the time deinterleaving control module 380, the reading address generating unit 350 and the writing address generating unit 360 generate the actual reading address and writing address of the time deinterleaving memory 320, respectively. The frequency deinterleaving control module 370 selects the LUT operation unit 372 or the permutation operation unit 374 according to the setting value to perform the frequency deinterleaving operation. Similarly, the time deinterleaving control module 380 also selects the convolution operation unit 382 or the row-column operation unit 384 according to the setting value to perform the time deinterleaving operation. It should be noted that, in the present invention, the term "access" is associated with reading data from a memory and/or writing data to a memory, and is not limited as an operation of simultaneously storing and writing data to/from a same memory.

With the collaboration of the reading address generating unit 330 and the writing address generating unit 340, the frequency deinterleaving control module 370 writes and reads the data of the interleaved signal to/from the frequency deinterleaving memory 310 to complete the frequency deinterleaving operation. For example, when the setting value indicates that the interleaved signal is the ISDB-T standard, the frequency deinterleaving control module 370 selects the LUT operation unit 372 to generate the reading index and the writing index, and the LUT operation unit 372 generates the reading index and the writing index by an LUT scheme. When the setting value indicates that the interleaved signal is one of the DTMB, DVB-T2 and DVB-C2 standards, the frequency deinterleaving control module 370 selects the permutation operation unit 374 to generate the reading index and the writing index, and the permutation operation unit 374 generates the reading index and the writing index according to a frequency deinterleaving rule defined by the standard. Details of frequency interleaving and deinterleaving based on an LUT operation (corresponding to the ISDB-T standard) and frequency interleaving and deinterleaving based on a permutation operation (corresponding to the DTMB, DVB-T2 and DVB-C2 standards) are specified in the respective standards and are generally known to one person skilled in the art, and operation details of the LUT operation unit 372 and the permutation operation unit 374 shall be omitted herein. In conclusion, the frequency deinterleaving control module 370 is capable of determining the frequency deinterleaving scheme to be used according to the signal standard indicated by the setting value. The reading index and the writing index accordingly generated are then converted to a reading address and a writing address by the reading address generating unit 330 and the writing address generating unit 340, respectively. Therefore, the frequency deinterleaving memory 310 may be shared by signals of different standards to complete the frequency deinterleaving operation, and four frequency deinterleaving memories of conventional receivers corresponding to four signal standards can be simplified into one single frequency deinterleaving memory, thereby significantly reducing the memory utilization requirement.

With the collaboration of the reading address generating unit 350 and the writing address generating unit 360, the time deinterleaving control module 380 writes and reads data of the interleaved signal to/from the time deinterleaving memory 320 to complete the time deinterleaving operation. For example, when the setting value indicates that the interleaved signal is the ISDB-T or DTMB standard, the time deinterleaving control module 380 selects the convolution operation unit to generate the reading index and the writing index. When the setting value indicates that the interleaved signal is the DVB-T2 or DVB-C2 standard, the time deinterleaving control module 380 selects the row-column operation unit 384 to generate the reading index and the writing index. Details of the convolution operation unit 382 and the row-column operation unit 384 for generating the reading index and the writing index are given below.

Assume that the convolution operation unit 382 is currently processing an $i^{th}$ carrier of a $j^{th}$ OFDM symbol of the interleaved signal.

In step 1, a branch parameter b is set. For the ISDB-T standard, the branch parameter b=i; for the DTMB standard, the branch parameter b=mod(i, 52).

In step 2, a delay buffer depth $L_b^*$ is calculated. For the ISDB-T standard, the delay buffer depth $L_b^*=1\times(95-\text{mod}(b\times5,96))$, where I=0, 1, 2, 4, 8, 16; for the DTMB standard, the delay buffer depth $L_b^*=M\times(52-b)$, where M=240 or 720.

In step 3, a buffer index $c_{b,j}^*$ is updated. The buffer index of the $b^{th}$ branch of the $j^{th}$ OFDM symbol $c_{b,j}^*=\text{mod}(c_{b,j-1}^*+1, L_b^*)$, where $c_{b,-1}^*$ is 0.

In step 4, a reading index $\text{rptr}=c_{b,j}^*+\Sigma_{m=0}^{b-1}L_m^*$ is generated. The reading address generating unit 350 generates the reading address of the time deinterleaving memory 320 according to this reading index, and the data at this address is read out.

In step 5, a writing index wptr-rptr is generated. That is, the writing index is made to be equal to the reading index. The writing address generating unit 360 generates the writing address of the time deinterleaving memory 320 according to this writing index, and a next set of data of the frequency deinterleaved signal is written to this address.

In step 6, the value i is increased (i.e., a next carrier is to be processed), and step 1 is iterated.

In step 7, when all the carriers of the current symbol have been processed, the value j is increased (i.e., a next symbol is to be processed) until all symbols have been processed. By sequencing the index as well as reading old data and writing new on the same index, the memory is accessed in the manner to simulate the delay buffer adopted by the convolution operation.

The row-column operation unit 384 performs the time deinterleaving operation by a unit of one TI block. Each TI block includes an $N_{FEC}$ number of forward error correction (FEC) blocks, each of which includes an $N_{cell}$ number of cells. In the row-column operation scheme, an amount of Nr rows×Nc columns in the time deinterleaving memory 320 is used, where Nr is $N_{cell}/5$ and Nc is $N_{FEC}\times5$. Initially, the row-column operation unit 384 generates the writing index to write the frequency deinterleaved signal to the time deinterleaving memory 320. A process of generating the writing index of the $i^{th}$ cell is as follows.

In step 1, a column index $C_i$ is generated. In the DVB-T, DVB-T2 and DVB-C2 standards, the column index $C_i=\text{mod}(i, N_c)$.

In step 2, a row index $R_i$ is generated. In the DVB-T, DVB-T2 and DVB-C2 standards, the row index $R_i=i\, \text{div}\, N_c$.

In step 3, the current cell of data is checked whether a data part. Due to differences of the DVB-C2 standard from the DVB-T2 and DVB-T standards, in addition to the data part of the signal, a pilot part is also carried in the frequency deinterleaving and time deinterleaving circuit 220, but the pilot part should not be rearrange din the time deinterleaving operation. Thus, for the DVB-C2 standard, if the row-column operation unit 384 determines that the current cell is not a data part, a writing operation is not performed. A writing operation is performed when the corresponding cell belongs to a data part. However, for operation a signal of the DVB-T2 and DVB-T standards, one writing index is generated for each cell.

In step 4, the value of i is increased (i.e., the next cell is to be processed), and step 1 is iterated until all cells of the TI block have been processed, a next block is to be processed.

When the column index $C_i$ and the row index $R_i$ have been generated, the writing address generating unit 360 accordingly generates the writing address, and the cell is written into the time deinterleaving memory 320 according to the writing address. When the data of the entire TI block (excluding the pilot part) is written into the time deinterleaving memory 320, the row-column operation unit 384 generates the reading index for reading the frequency deinterleaved signal from the time deinterleaving memory 320 to complete the time deinterleaving operation. A process of generating the reading index of the $i^{th}$ cell is as follows.

In step 1, a column index $C_i$ is generated. The column index of the DVB-T standard is $C_i=\text{mod}(i,N_c)$, the column index of the DVB-T2 standard is $C_i=i\ \text{div}N_r$, and the column index of the DVB-C2 standard is $C_i=\text{mod}(i,N_c)$.

In step 2, a row index $R_i$ is generated. The row index of the DVB-T standard is $R_i=i\ \text{div}N_c$, the row index of the DVB-T2 standard is $R_i=\text{mod}(i,N_r)$, and the row index of the DVB-C2 standard is $R_i=\text{mod}(C_i,N_r)+(i\ \text{div}N_c),N_r)$.

In step 3, the value of i is increased (i.e., a next cell is to be processed), and step 1 is iterated until all cells have been processed, a next block is to be processed.

When the column index $C_i$ and the row index $R_i$ have been generated, the reading address generating unit 350 accordingly generates the reading address. By reading the data according to this reading sequence from the time deinterleaving memory 320, the time deinterleaved signal can be obtained. In step 2 above, as the row-column operation adopted by the DVB-C2 standard additionally includes a twist component, further operation details are given with an example below. FIG. 4A and FIG. 4B show diagrams of a memory configuration and a memory accessing sequence when the row-column operation unit 384 performs a row-column operation on a DVB-C2 signal. In this example, $N_r=6\cdot N_c=7$. When i=0~5, $C_i=i$ and $R_i=\text{mod}(i+0.6)=i$; when i=6, $C_i=6$ and $R_i=\text{mod}(6+0.6)=0$; when i=7, $C_i=6$ and $R_i=\text{mod}(0+1.6)=1$; and so forth.

In conclusion, the time deinterleaving control module 380 determines the time deinterleaving scheme according to the signal standard indicated by the setting value. The generated reading index and writing index are then respectively converted to the reading address and the writing address by the reading address generating unit 350 and the writing address generating unit 360. Thus, the time deinterleaving memory 320 may be shared by signals of different standards to complete the frequency deinterleaving operation, and four time deinterleaving memories of conventional receivers corresponding to four signal standards can be simplified into one single time deinterleaving memory, thereby significantly reducing the memory utilization requirement. In the embodiment in FIG. 3, the frequency deinterleaving memory 310 and the time deinterleaving memory 320 are disposed inside the frequency deinterleaving and time deinterleaving circuit 220. However, in implementation, without substantially modifying operations of the frequency deinterleaving and time deinterleaving circuit 220, the frequency deinterleaving memory 310 and the time deinterleaving memory 320 may also be disposed outside the frequency deinterleaving and time deinterleaving circuit 220. It should be noted that, as far as the DVB-T standard is concerned, the transmitter does not perform any interleaving operation on the signals. Therefore in theory, due to difference of modulation of the DVB-T standard, after the digital television signal is processed by the front-end circuit 210, the processed digital television signal can be decoded by the decoding circuit 260 without undergoing the processes of the frequency deinterleaving and time deinterleaving circuit 220 and the QAM demapping circuit 240. However, the memory in the frequency deinterleaving and time deinterleaving circuit 220 is left idle if the frequency deinterleaving and time deinterleaving operation is not performed. To fully utilize hardware resources, when the signal processed by the receiver 200 is a DVB-T signal, the memory in the frequency deinterleaving and time deinterleaving circuit 220 may serve as a buffer memory of the decoding circuit 260 to enhance the stability of the decoding circuit 260. That is to say, when the signal processed by the receiver 200 of the digital television is a DVB-T signal, the memory in the frequency deinterleaving and time deinterleaving circuit 220 serves as a general buffer. Therefore, the frequency deinterleaving and time deinterleaving circuit 220 need not adjust the sequences of writing data to and reading data from the memory, i.e., the sequences are not changed before entering and after exiting the memory. As previously stated, the column indices of the writing index and the reading index are both $C_i=\text{mod}(i,N_c)$, and the row indices are both $R_i=i\ \text{div}N_c$. Therefore, in FIG. 2, when the signal processed by the receiver 200 of the digital television is a DVB-T signal, according to the setting value, the demultiplexer 230 outputs the signal of the frequency deinterleaving and time deinterleaving circuit 220 to the multiplexer 250 while bypassing the QAM demapping circuit 240, and the multiplexer 250 similarly selects and outputs the processed signal by the QAM demapping circuit 240 according to the setting value to the decoding circuit 260.

Figure 5:
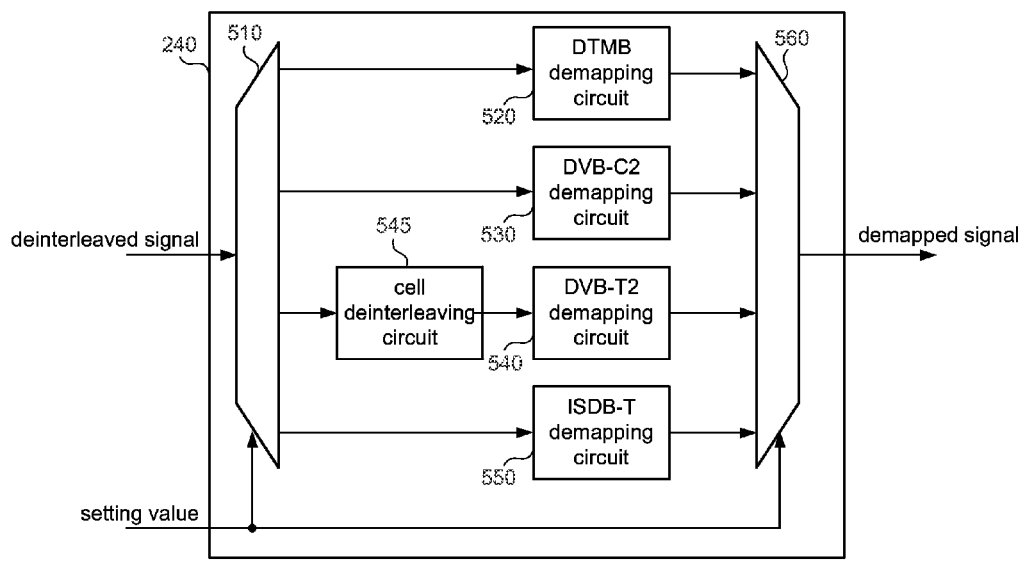
FIG. 5 is a function block diagram of a QAM demapping circuit 240 according to an embodiment of the present invention.

FIG. 5 shows a function block diagram of a QAM demapping circuit according to an embodiment of the present invention. The QAM demapping circuit 240 includes a demultiplexer 510, a DTMB demapping circuit 520, a DVB-C2 demapping circuit 530, a DVB-T2 demapping circuit 540, a cell deinterleaving circuit 545, an ISDB-T demapping circuit 550, and a multiplexer 560. The DTMB demapping circuit 520, the DVB-C2 demapping circuit 530, the DVB-T2 demapping circuit 540 and the ISDB-T demapping circuit 550 respectively perform demapping operations on signals of the corresponding signal standards. As the DVB-T2 standard further includes a cell interleaving operation at the transmitter, the receiver is required to process the DVB-T2 signal by the corresponding cell deinterleaving circuit 545. The demultiplexer 510 outputs the deinterleaved signal via the corresponding path according to the setting value. Similarly, the multiplexer 560 selects the corresponding path according to the setting value and outputs the signal via the selected path as the demapped signal.

Figure 6:
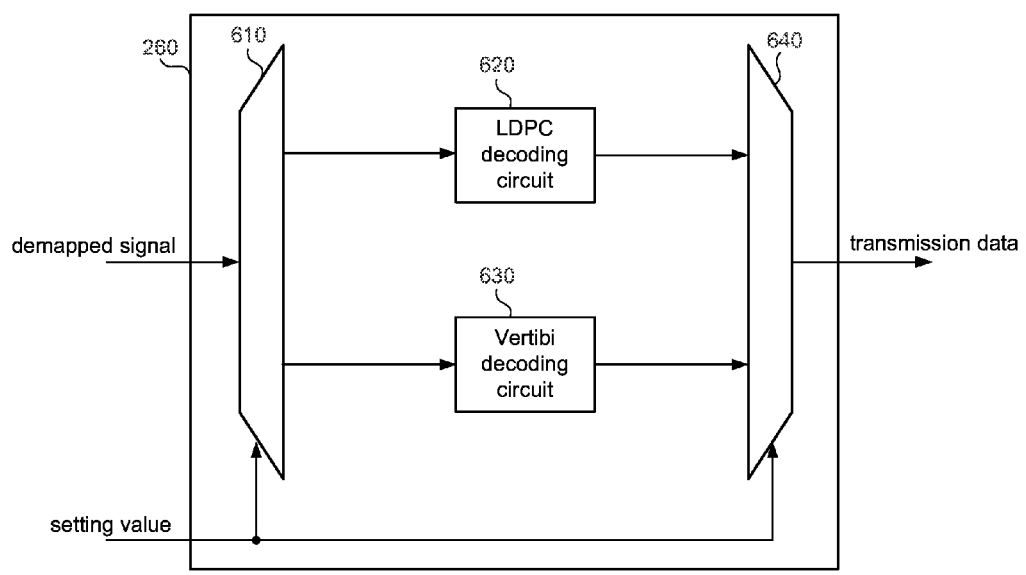
FIG. 6 is a function block diagram of a decoding circuit 260 according to an embodiment of the present invention.

FIG. 6 shows a function block diagram of a decoding circuit 260 according to an embodiment of the present invention. The decoding circuit 260 includes a demultiplexer 610, an LDPC decoding circuit 620, a Vertibi decoding circuit 630 and a multiplexer 640. The demultiplexer 610 outputs the demapped signal to the appropriate decoding circuit according to the setting value. For example, if the signal is of the ISDB-T standard or of the DVB-T standard, the demapped signal is outputted to the Vertibi decoding circuit 630; if the signal is of the DTMB standard, of the DVB-T2 standard, or of the DVB-C2 standard, the demapped signal is outputted to the LDPC decoding circuit 620. The multiplexer 640 similarly outputs the corresponding decoded signal according to the setting value to obtain the transmission data.

In conclusion, in the present invention, the frequency deinterleaving and time deinterleaving operations are completed by using shared frequency deinterleaving memory and time deinterleaving memory. Therefore, in present invention, only one memory is required for the receiver 200 of a digital television supporting multiple standards. The present invention may be applied so as to manufacture television chips compatible to different digital television standards and is advantageous in cost aspect.

Figure 7:
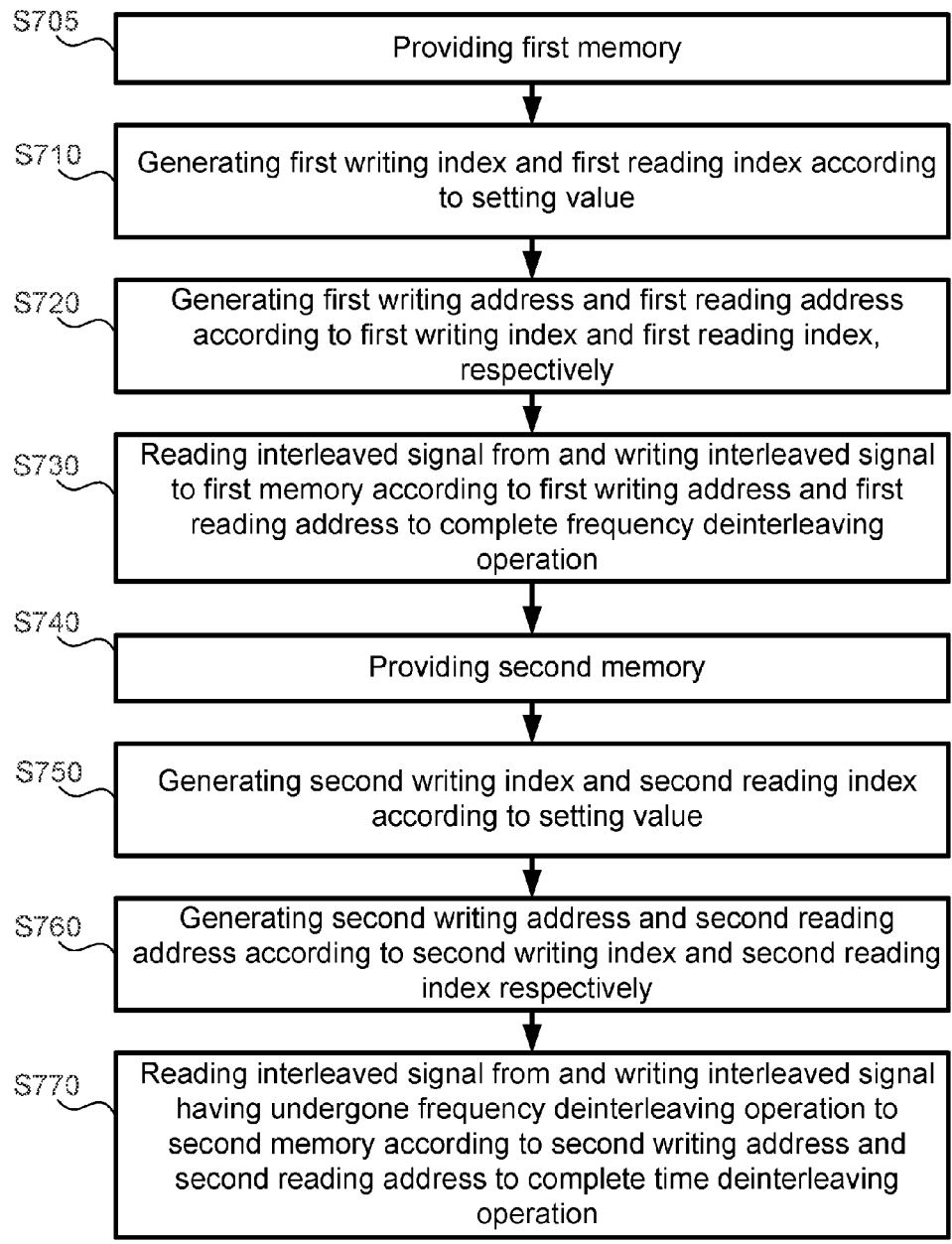
FIG. 7 is a flowchart of a frequency deinterleaving and time deinterleaving method according to an embodiment of the present invention.

FIG. 7 shows a flowchart of a frequency deinterleaving and time deinterleaving method according to an embodiment of the present invention. In addition to the above-mentioned frequency deinterleaving and time deinterleaving circuit, the present invention discloses a frequency deinterleaving and time deinterleaving method may adapt for a receiver of a digital television. The method may be performed by the above-mentioned receiver 200 of a digital television or any equivalent devices. As shown in FIG. 7, the frequency deinterleaving and time deinterleaving method of the present invention is used to perform a frequency deinterleaving operation and a time deinterleaving operation on an interleaved signal, and includes following steps.

In step S705: providing a first memory.

In step S710: generating a first writing index and a first reading index according to a setting value. The setting value indicates a digital video standard of the interleaved signal, e.g., the DVB-T, DVB-T2, DVB-C2, ISDB-T, or DTMB standard. This step performs a frequency deinterleaving operation. The first writing index and the first reading index are generated primarily according to operation concepts—LUT and permutation operations. The ISDB-T standard adopts the LUT operation, and the DTMB, DVB-T2 and DVB-C2 standards adopt the permutation operation. Thus, according to the signal standard indicated by the setting value, this step selects the LUT operation or the permutation operation to generate the first writing index and the first reading index.

In step S720: generating a first writing address and a first reading address according to the first writing index and the first reading index, respectively. The first writing address may be generated by a writing address generating unit according to the first writing index, and the first reading address may be generated by a reading address generating unit according to the first reading index.

In step S730: writing to and reading from the interleaved signal in the first memory according to the first writing address and the first reading address, respectively, to complete the frequency deinterleaving operation. After the first writing address and the first reading address are generated, the interleaved signal may be written to the first memory according to the first writing address and read from the first memory according to the first reading address. The sequence of the first writing address and the first reading address are opposite to which of the frequency interleaving operation performed by a transmitter. Thus, after reading the signal, the frequency deinterleaving operation is completed to obtain the frequency deinterleaved signal.

In step S740: providing a second memory.

In step S750: generating a second writing index and a second reading index according to the setting value. This step performs a time deinterleaving operation. The second writing index and the second reading index are generated primarily according to two operation concepts—convolution and row-column operations. The ISDB-T standard and the DTMB standard adopt the convolution operation, and the DVB-T2 standard and the DVB-C2 standard adopt the row-column operation. Thus, this step selects the convolution operation or the row-column operation according to the signal standard indicated by the setting value to generate the second writing index and the second reading index.

In step S760: generating a second writing address and a second reading address according to the second writing index and the second reading index, respectively. The second writing address may be generated by a writing address generating unit according to the second writing index, and the second reading address may be generated by a reading address generating unit according to the second reading index.

In step S770: writing to and reading from the interleaved signal that has undergone frequency interleaving in the second memory according to the second writing address and the second reading address, respectively, to complete the time deinterleaving operation. After the second writing address and the second reading address are generated, the frequency deinterleaved signal may be written to the second memory according to the second writing address and read from the second memory according to the second reading address. Thus, after reading the signal, the time deinterleaving operation is completed to obtain the deinterleaved signal.

Figure 8:
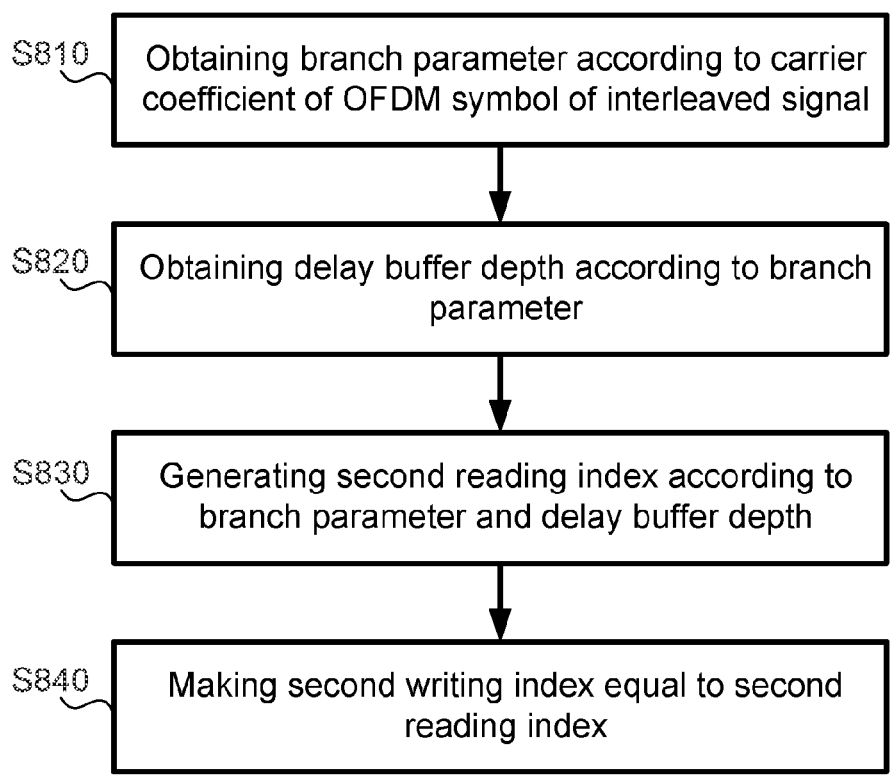
FIG. 8 is a flowchart of generating a second writing index and a second reading index by a convolution operation method.

Referring to FIG. 8, when step S750 selects the convolution operation to generate the second writing index and the second reading index, steps below are performed.

In step S810: obtaining a branch parameter b according to a carrier coefficient of an ODFM symbol of the interleaved signal. The interleaved signal is a QAM signal based on OFDM. Similar to the step 1 details of the convolution operation unit 382, the branch parameter b is generated according to the carrier coefficient i.

In step S820: obtaining a delay buffer depth $L_b^*$ according to the branch parameter b. Similar to the step 2 details of the convolution operation unit 382, the delay buffer depth $L_b^*$ is calculated according to the branch parameter b. For the ISDB-T and DTMB standards, the delay buffer depth $L_b\hat{}$ is obtained with different calculation methods.

In step S830: generating the second reading index according to the branch parameter b and the delay buffer depth $L_b^*$. Similar to the step 3 and step 4 details of the convolution operation unit 382, the buffer index $c_{b,j}^*$ can be updated according to the branch parameter b and the delay buffer depth $L_b^*$, and then the reading index can be generated according to the buffer index $C_{b,j}^*$, the branch parameter b, and the delay buffer depth $L_b^*$. That is to say, the reading index is generated according to the branch parameter b and the delay buffer depth $L_b^*$.

In step S840: obtaining the second writing index which is made to equal to the second reading index. Similar to the step 5 details of the convolution operation unit 382, for the same carrier coefficient, the writing index is made to equal to the reading index. That is, when data is read from an address of the memory, a next set of data is to be written to the same address.

Further, when step above-mentioned S750 selects the row-column operation to generate the second writing index and the second reading index, the second writing index and the second reading index are obtained according to the carrier coefficient of the OFDM symbol of the interleaved signal, row count information of the second memory, and column count information of the second memory. Details of the row-column operation unit 382 are previously described and shall be omitted herein.

Further, in step S710 and/or step S750 above, if the setting value indicates that the digital video standard of the interleaved signal is DVB-T, the reading index can simply be made to equal to the writing index. That is to say, for the DVB-T standard, the sequences for writing data to the memory and reading data from the memory are not rearranged. Therefore, the first memory and/or the second memory merely serve(s) as buffers for the decoding circuit.

One person skilled in the art can understand details and possible equivalent implementation and variations of the methods in FIG. 7 and FIG. 8 according to the disclosure of the devices in FIG. 2 to FIG. 6. Without affecting the full disclosure and implementation possibility, repeated description is omitted herein. Further, the shapes, sizes, ratios and sequences of the steps in the drawings are examples for explaining the present invention to one person skilled in the art, not limiting the present invention. Within the realms of implementation possibility, one skilled person in the art would selectively implement part or all technical features of any embodiment of the application or selectively combine part or all technical features of the embodiments of the application based on the disclosure of the present invention with enhanced flexibility.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency deinterleaving and time deinterleaving circuit, configured to perform a frequency deinterleaving operation and a time deinterleaving operation on an interleaved signal by using a first memory and a second memory, the circuit adapted for multiple digital video standards, the circuit comprising:
  a frequency deinterleaving control module, configured to generate a first access index according to a setting value;
  a time deinterleaving control module, configured to generate a second access index according to the setting value;
  a first address generating unit, configured to generate a first access address according to the first access index; and
  a second address generating unit, configured to generate a second access address according to the second access index;
  wherein, the setting value corresponds to a digital video standard of the interleaved signal; the first memory is accessed for temporary data of the frequency deinterleaving operation according to the first access address, and the second memory is accessed for temporary data of the time deinterleaving operation according to the second access address,
  wherein the time deinterleaving control module further comprises a convolution operation unit and a row-column operation unit, and the time deinterleaving control module selects one of the convolution operation unit and the row-column operation unit according to the setting value.

2. The frequency deinterleaving and time deinterleaving circuit according to claim 1, wherein the second access index comprises a second reading index; the convolution operation unit obtains a first parameter according to a carrier coefficient of an orthogonal frequency division multiplexing (OFDM) symbol of the interleaved signal, obtains a second parameter according to the first parameter, and generates the second reading index according to the first parameter and the second parameter.

3. The frequency deinterleaving and time deinterleaving circuit according to claim 2, wherein the second access index further comprises a second writing index, the second reading index and the second writing index vary according to the carrier coefficient, and the second writing index is equal to the second reading index for the same carrier coefficient.

4. The frequency deinterleaving and time deinterleaving circuit according to claim 1, wherein the row-column operation unit obtains the second access index according to a carrier coefficient of an OFDM symbol of the interleaved signal, row count information of the second memory, and column count information of the second memory.

5. The frequency deinterleaving and time deinterleaving circuit according to claim 4, wherein when the interleaved signal is a Digital Video Broadcasting—Second Generation Cable (DVB-C2) signal, the row-column operation unit further determines whether the carrier coefficient is a data part of the interleaved signal.

6. The frequency deinterleaving and time deinterleaving circuit according to claim 1, wherein the frequency deinterleaving control module comprises a look-up table (LUT) operation unit and a permutation operation unit, and selects one of the LUT operation unit and the permutation operation unit according to the setting value.

7. The frequency deinterleaving and time deinterleaving circuit according to claim 1, wherein when the interleaved signal is a Digital Video Broadcasting—Terrestrial (DVB-T) signal, the first memory and/or the second memory serve(s) as a buffer memory.

8. A receiving circuit of a digital television, adapted to process a digital television signal to generate transmission data, comprising:
  a front-end circuit, configured to process the digital television signal to generate an interleaved signal;
  a setting unit, configured to provide a setting value associated with a digital video standard of the digital television signal;
  a frequency deinterleaving and time deinterleaving circuit, configured to select a frequency deinterleaving operation and a time deinterleaving operation corresponding to the digital video standard according to the setting value, and to process the interleaved signal to generate a deinterleaved signal;
  a quadrature amplitude modulation (QAM) demapping circuit, configured to demap the deinterleaved signal to generate a demapped signal; and
  a decoder, configured to decode the demapped signal to generate the transmission data,
  wherein the time deinterleaving control module further comprises a convolution operation unit and a row-column operation unit, and the time deinterleaving control module selects one of the convolution operation unit and the row-column operation unit according to the setting value.

9. The receiving circuit according to claim 8, wherein the frequency deinterleaving and time deinterleaving circuit performs the frequency deinterleaving operation and the time deinterleaving operation by using a first memory and a second memory, and the frequency deinterleaving and time deinterleaving circuit comprises:
a frequency deinterleaving control module, configured to generate a first access index according to the setting value;
a time deinterleaving control module, configured to generate a second access index according to the setting value;
a first address generating unit, configured to generate a first access address according to the first access index; and
a second address generating unit, configured to generate a second access address according to the second access index;
wherein, the first memory is accessed for temporary data of the frequency deinterleaving operation according to the first access address, and the second memory is accessed for temporary data of the time deinterleaving operation according to the second access address.

10. The receiving circuit according to claim 9, wherein the frequency deinterleaving control module comprises an LUT operation unit and a permutation operation unit, and selects one of the LUT operation unit and the permutation operation unit according to the setting value.

11. The receiving circuit according to claim 9, wherein when the interleaved signal is a DVB-T signal, the first memory and/or the second memory serve(s) as a buffer memory.

12. The receiving circuit according to claim 8, wherein the second access index comprises a second reading index; the convolution operation unit obtains a first parameter according to a carrier coefficient of an OFDM symbol of the interleaved signal, obtains a second parameter according to the first parameter, and generates the second reading index according to the first parameter and the second parameter.

13. The receiving circuit according to claim 12, wherein the second access index further comprises a second writing index, the second reading index and the second writing index vary according to the carrier coefficient, and the second writing index is equal to the second reading index for the same carrier coefficient.

14. The receiving circuit according to claim 8, wherein the row-column operation unit obtains the second access index according to a carrier coefficient of an OFDM symbol of the interleaved signal, row count information of the second memory, and column count information of the second memory.

15. The receiving circuit according to claim 14, wherein when the interleaved signal is a DVB-C2 signal, the row-column operation unit further determines whether the carrier coefficient is a data part of the interleaved signal.

16. A frequency deinterleaving and time deinterleaving method, adapted for multiple digital video standards, for performing a frequency deinterleaving operation and a time deinterleaving operation on an interleaved signal by using a first memory and a second memory, the method comprising:
generating a first access index according to a setting value;
generating a first access address according to the first access index;
accessing the interleaved signal in the first memory according to the first access address to complete the frequency deinterleaving operation;
generating a second access index according to the setting value;
generating a second access address according to the second access index; and
accessing the interleaved signal having undergone the frequency deinterleaving operation in the second memory according to the second access address to complete the time deinterleaving operation;
wherein, the setting value corresponds to a digital video standard of the interleaved signal,
wherein the step of generating the second access index according to the setting value comprises:
selecting one of a convolution operation and a row-column operation according to the setting value; and
generating the second access index according to the selected one of the convolution operation and the row-column operation.

17. The frequency deinterleaving and time deinterleaving method according to claim 16, wherein the second access index comprises a second reading index, and the step of generating the second access index according to the convolution operation comprises:
obtaining a first parameter according to a carrier coefficient of an OFDM symbol of the interleaved signal;
obtaining a second parameter according to the first parameter; and
generating the second reading index according to the first parameter and the second parameter.

* * * * *